United States Patent
Peng et al.

(10) Patent No.: US 9,524,656 B2
(45) Date of Patent: Dec. 20, 2016

(54) SIGN LANGUAGE IMAGE INPUT METHOD AND DEVICE

(71) Applicant: SABUZ TECH. CO., LTD., New Taipei (TW)

(72) Inventors: Chien Chiang Peng, New Taipei (TW); Cheng Yi Yeh, New Taipei (TW); Yu Wei Wang, New Taipei (TW)

(73) Assignee: SABUZ TECH. CO., LTD., New Taipei (TW)

( * ) Notice: Subject to any disclaimer, the term of this patent is extended or adjusted under 35 U.S.C. 154(b) by 0 days.

(21) Appl. No.: 14/790,914

(22) Filed: Jul. 2, 2015

(65) Prior Publication Data
US 2016/0005336 A1   Jan. 7, 2016

(30) Foreign Application Priority Data

Jul. 4, 2014 (TW) .............................. 103123174 A (51) Int. Cl.
| | |
|---|---|
| *H04N 7/14* | (2006.01) |
| *G06F 3/02* | (2006.01) |
| *G09B 21/00* | (2006.01) |
| *G06F 17/30* | (2006.01) |

(52) U.S. Cl.
CPC ......... *G09B 21/009* (2013.01); *G06F 17/3056* (2013.01); *G06F 17/30247* (2013.01); *G06F 17/30277* (2013.01); *H04N 7/147* (2013.01)

(58) Field of Classification Search
CPC .......... H04N 7/147; H04N 7/15; G06F 3/0219
USPC ................. 348/14.01, 14.08, 14.09; 345/168
See application file for complete search history.

(56) References Cited

U.S. PATENT DOCUMENTS

| | | | | |
|---|---|---|---|---|
| 8,711,100 | B2* | 4/2014 | Ohki | ..................... G06F 3/0219 |
| | | | | 345/168 |
| 2006/0125914 | A1* | 6/2006 | Sahashi | .................... H04N 7/15 |
| | | | | 348/14.02 |
| 2009/0012788 | A1* | 1/2009 | Gilbert | ..................... G10L 21/06 |
| | | | | 704/235 |
| 2010/0046796 | A1 | 2/2010 | Pietquin | |
| | | (Continued) | | |

FOREIGN PATENT DOCUMENTS

| | | |
|---|---|---|
| CN | 101213563 A | 7/2008 |
| EP | 0905644 A2 | 3/1999 |
| (Continued) | | |

*Primary Examiner* — Quoc D Tran
(74) *Attorney, Agent, or Firm* — Li & Cai Intellectual Property (USA) Office (57) ABSTRACT

A sign language image input method and a device are illustrated. The sign language image input method is provided for a computer device which has a database. The database has a plurality of sign language images, wherein each of the sign language images correspondingly has a code combination. Steps of the sign language image input method are described as follows. The computer device generates at least one key combination by pressing a plurality of key blocks which are disposed in the computer device, wherein the key combination is formed based on at least one hand shape, at least one position, and/or at least one hand action of an input sign language image. The key combination is compared with all code combinations of the database. The input sign language image is outputted according to a comparison result of the key combination and the all code combinations.

10 Claims, 6 Drawing Sheets

(56) References Cited

U.S. PATENT DOCUMENTS

2010/0112530 A1\* 5/2010 Schoenbach ...... G06F 17/30017
                                                    434/116
2011/0234384 A1\* 9/2011 Agrawal .............. G09B 21/009
                                                    340/10.5

FOREIGN PATENT DOCUMENTS

| JP | 2000-89660 A | 3/2000 |
| TW | 201310404 A1 | 3/2013 |
| TW | M455912 U1 | 6/2013 |
| TW | 201426342 A | 7/2014 |

\* cited by examiner

FIG.1

| location | sign language image | code combination | representative term | |
|---|---|---|---|---|
| 0 | | 201_0<br><br>1 chest | 203_0<br><br>me | 205_0 |
| 1 | | 201_1<br><br>1 chest rotating | 203_1<br><br>we | 205_1 |
| 2 | | 201_2<br><br>1 rotating | 203_2<br><br>they | 205_2 |
| ⋮ | | | | |
| k-1 | | 201_k-1<br><br>2 face outside | 203_k-1<br><br>father | 205_k-1 |
| k | | 201_k<br><br>55 mutual rotating | 203_k<br><br>frog | 205_k |

SIGN LANGUAGE IMAGE INPUT METHOD AND DEVICE

BACKGROUND OF THE INVENTION

1. Field of the Invention

The instant disclosure relates to a sign language image input method and a device using the same; in particular, to a sign language image input method and a device using the same, which generate corresponding input sign language images via a simplified key-in process.

2. Description of Related Art

Generally, the deaf who lost his hearing ability within the pre-linguistic period, even though well educated, still has a weak written communication ability like the elementary school student at the first or the second grade. Thus, they would not be able to use the modern communication technology, such as voice call, message, instant communication, social network website, using the note software to make notes, and even making notes on papers. The only communication way for them is to use sign languages via the webcam communication. However, the webcam communication is not a written system, and there would be no "words" for the sign languages and the sign languages is stored only in the videos.

Moreover, the sign language image, via static images, represents the sign language terms that represents certain movements. Thus, for a certain degree, the sign language image can be viewed as the words of the sign language, and the a set of the sign language images can be viewed as a sentence of the sign language.

SUMMARY OF THE INVENTION

In order to solve the above problems, the instant disclosure provides a sign language image input method and a device using the same. The sign language image input method and the device using the same generates corresponding sign language images via a simplified key-in process, such that people can easily record or transmit the sign language images with the development of the modern communication technology, and also the convenience for the communication among the deaf would be effectively improved.

One embodiment of the instant disclosure provides a sign language image input method used in a computer device. The computer device comprises a database, wherein a plurality of sign language images are stored in the database, and each of the sign language images corresponds to a code combination. The sign language image input method comprising: generating at least a key combination via pressing a plurality of key blocks of the computer device, wherein the key combination is set according to at least a hand shape, a position and/or a hand action of an input sign language image; comparing the key combination with the code combinations in the database; and outputting the input sign language image according to a comparison result of the key combination and the code combinations.

The instant disclosure further provides a sign language image input device, and the sign language image input device comprises one or more circuits. The one or more circuits are configured to form a database, a plurality of key blocks, a searching module and a sign language image output module. A plurality of sign language images are stored in the database, and each of the sign language images corresponds to a code combination. The plurality of key blocks generates at least a key combination via pressing the key blocks, wherein the key combination is set according to at least a hand shape, a position and/or a hand action of an input sign language image. The searching module generates the key combination, and compares the key combination and the code combinations in the database. The sign language image output module outputs the input sign language image according to a comparison result of the key combination and the code combinations.

To sum up, the sign language image and the device using the same provided by the embodiments of the instant disclosure can search and find out a corresponding sign language image from a database via a key combination generated according to at least a hand shape, a position and/or a hand action of an input hand action. Thus, the instant disclosure can effectively improve the convenience for the communication among the deaf.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

The sign language image input method and the device using the same provided by the embodiments of the instant disclosure generates corresponding sign language images via a simplified key-in process, such that people can easily record or transmit the sign language images with the development of the modern communication technology, and also the convenience for the communication among the deaf would be effectively improved.

The sign language image input method and the device using the same provided by the embodiments of the instant disclosure can be used in any computer device, such as a mobile communication device, a desktop, a laptop and the like, but it is not limited herein.

Moreover, sign language is a language that makes expressions via gestures or other movements without voices. Thus, the sign language image refers to a static image that represents a moving sign language term. In other words, the sign language images can represent the words of the sign language, and this a serial of sign language image can represent a sentence. However, the sign language is not a common language worldwide, so every country would develop different sign languages based on its native language. For example, 60% of the sign language in Taiwan is influenced by the sign language in Japan, and part of the sign language in Taiwan is influenced by the sign language in Hong Kong. In brief, the sign languages in different countries are not entirely the same. However, the sign language image input method provided by the embodiment of the instant disclosure can be applied in any sign language in any country.

Figure 1:
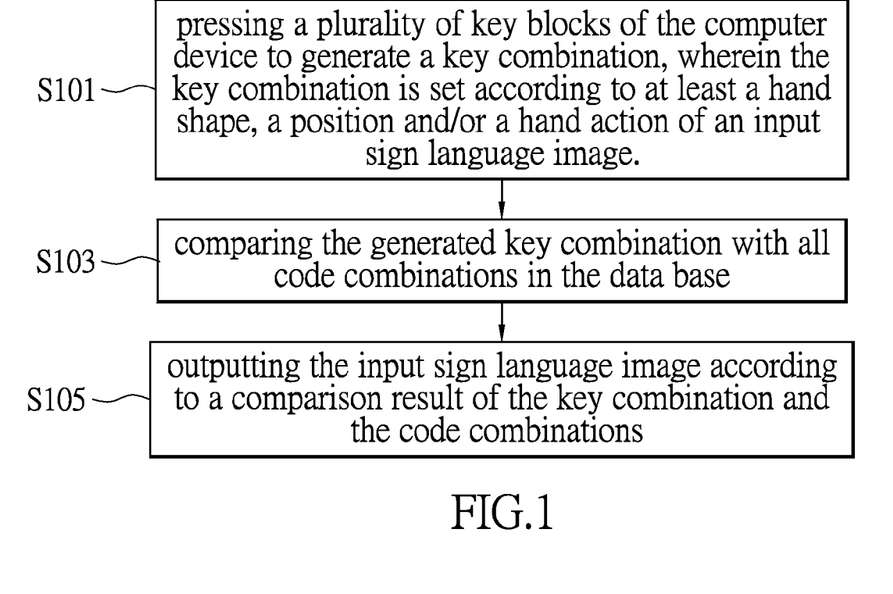
FIG. 1 shows a flow chart of a sign language image input method of one embodiment of the instant disclosure.

Please refer to FIG. 1, FIG. 1 shows a flow chart of a sign language image input method of one embodiment of the instant disclosure. The sign language image input method in this embodiment can be applied in the computer device having a database, wherein a plurality of sign language images are stored in the database and each sign language image has a corresponding code combination.

Figure 2:
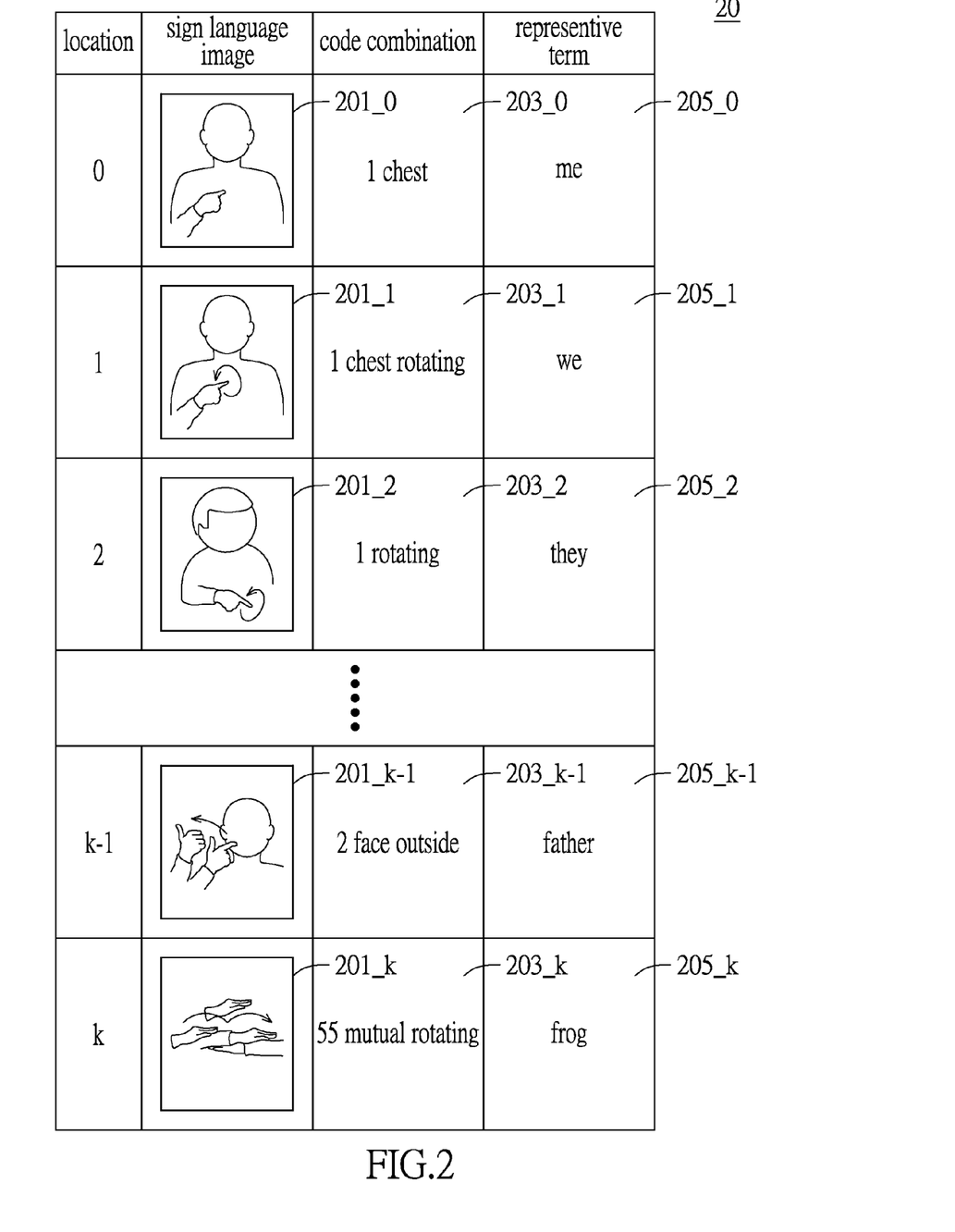
FIG. 2 shows a database of a computer device provided by one embodiment of the instant disclosure.

In conjunction with FIG. 1 and FIG. 2, FIG. 2 shows a database of a computer device provided by one embodiment of the instant disclosure. Specifically speaking, a plurality of sign language images 201_0~201_$k$ are stored in a database 20, and each of the sign language images 201_0~201_$k$ respectively has a corresponding code combination 203_0~203_$k$. For example, the code combination 203_2 corresponds to the sign language image 201_2, and the code combination 203_$k$-1 corresponds to the sign language image 201_$k$-1. It is worth mentioning that, the sign language images 201_0~201_$k$ and the corresponding code combinations 203_0~203_$k$ in the database can be set by referring to "*Common Sign Language Tern Painting Album*" published by the Taiwan Ministry of Education, and it is not limited herein. In addition, each of the sign language images 201_0~201_$k$ in the database 20 respectively has a corresponding representative term 205_0~205_$k$, wherein the corresponding representative terms 205_0~205_$k$ represent the word meaning of the corresponding sign language images 201_0~201_$k$.

Please again refer to FIG. 1, in the step S101, the user presses a plurality of key blocks of the computer device to generate a key combination, wherein the key combination is set according to at least a hand shape, a position and/or a hand action of an input sign language image. In the step S103, the computer device compares the generated key combination with all code combinations in the data base. In the step S105, the computer device outputs the input sign language image according to a comparison result of the key combination and the code combinations.

Figure 3:
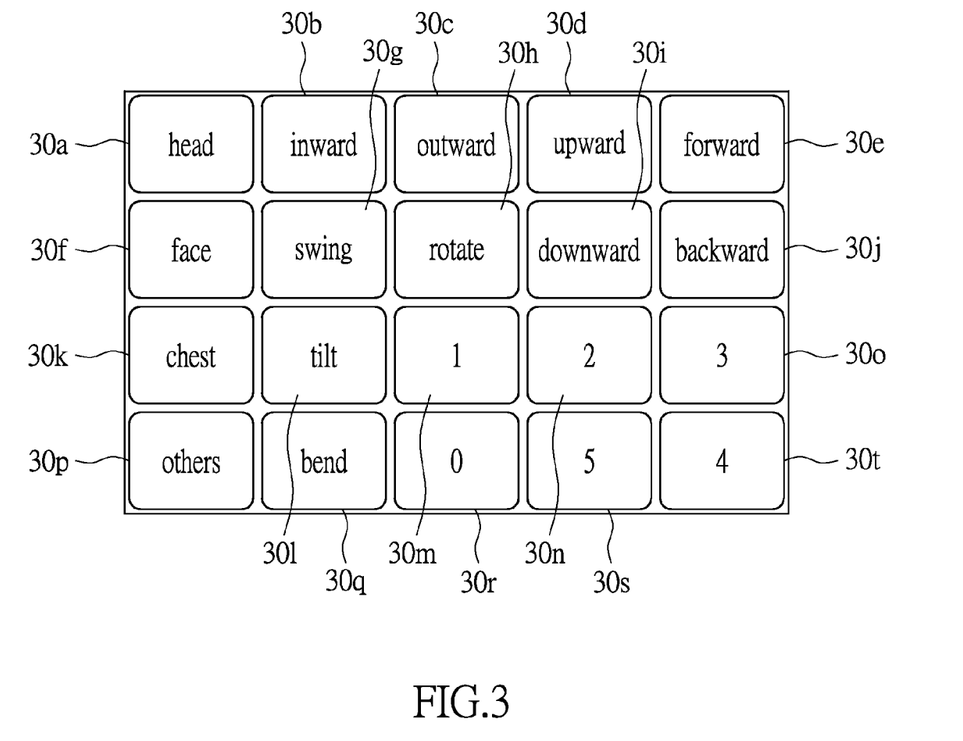
FIG. 3 shows a key block provided by one embodiment of the instant disclosure.

More precisely, in conjunction with FIG. 1 and FIG. 3, FIG. 3 shows a key block provided by one embodiment of the instant disclosure. The key blocks 30$a$~30$t$ of the computer device are defined based on a plurality of hand shapes, positions and hand actions of the sign language images. The key blocks 30$a$~30$t$ is implemented via a substantial keyboard or a virtual keyboard shown on the touch screen. Briefly, a moving expression for the sign languages is expressed via the hand shape, the position and the hand action. The hand shape is the shape form based on the fingers and the number of fingers. For example, in the key blocks, "1" 30$m$, "2" 30$n$, "3" 30$o$, "0" 30$r$, "5" 30$s$ and "4" 30$t$ respectively represent for one finger, two fingers, three fingers, no finger, five fingers and four fingers. The position is a position of a human organ that is pointed by the finger in the sign language expression. For example, in the key blocks, the "head"30$a$、"face"30$f$、"chest"30$k$、"other"30$p$ respectively represent that the hand position id at the user's head, face, chest or other body part. The hand action is a movement of the finger or the hand in the sign language expression. For example, in the key blocks "inward"30$b$、"outward"30$c$、"upward"30$d$、"forward"30$e$、"swing"30$g$、"rotate"30$h$、"downward"30$i$、"backward"30$j$、"tilted"30$l$、"bend"30$d$ respectively represent that the hand action is a movement to point inward, point outward, point upward, point forward, swing, rotate, point downward, point backward, point in a tilted direction and bend the finger.

In conjunction with FIG. 2 and FIG. 3, for example, as one finger points to the chest, it means a representative term "me" 205_0. Thus, the corresponding code combination is "1 chest" 203_0. On the other hand, via orderly pressing "1" 30$m$ and "chest"30$k$ in the key blocks, the sign language image 201_0 representing for "me" can be generated as the input sign language image. Thus, the instant disclosure is to make the complicated sign language expression via a simplified key-in process, and to directly disassemble the complicated sign language expression as a code combination corresponding to the sign language image based on the hand shape, the position and hand action in the sign language image Moreover, it is worth mentioning that, the arrangement and the input order of the key blocks 30$a$~30$t$ can be designed by the skilled in the art depending on needs, the implementation of the step S101 and the key blocks 30$a$~30$t$ is not limited herein.

Please refer to FIGS. 1~3, the following description is to take generating a sign language image representing "me" for example to illustrate the instant disclosure, and it is not limited herein. First, in the step S101, the user presses the "1" 30$m$ and "chest" 30$k$ in the key blocks, so as to generate a key combination "1 chest". In the step S103, the computer device compares the generated key combination "1 chest" by pressing the key blocks with all code combinations 203_0~203_$k$ in the database. In the step S105, the computer device outputs the sign language image "me"201_0 as the input sign language image, according to a comparison result between the key combination "1 chest" and all code combinations 203_0~203_$k$. More precisely, the computer device finds the code combination 203_0 among all the code combinations 203_0~203_$k$, wherein the similarity between the code combination 203_0 and the key combination 203_0, which is "1 chest", is qualified. After that, the computer device provides the sign language image 201_0 corresponding to the found code combination 203_0 as the input sign language image.

Figure 4A:
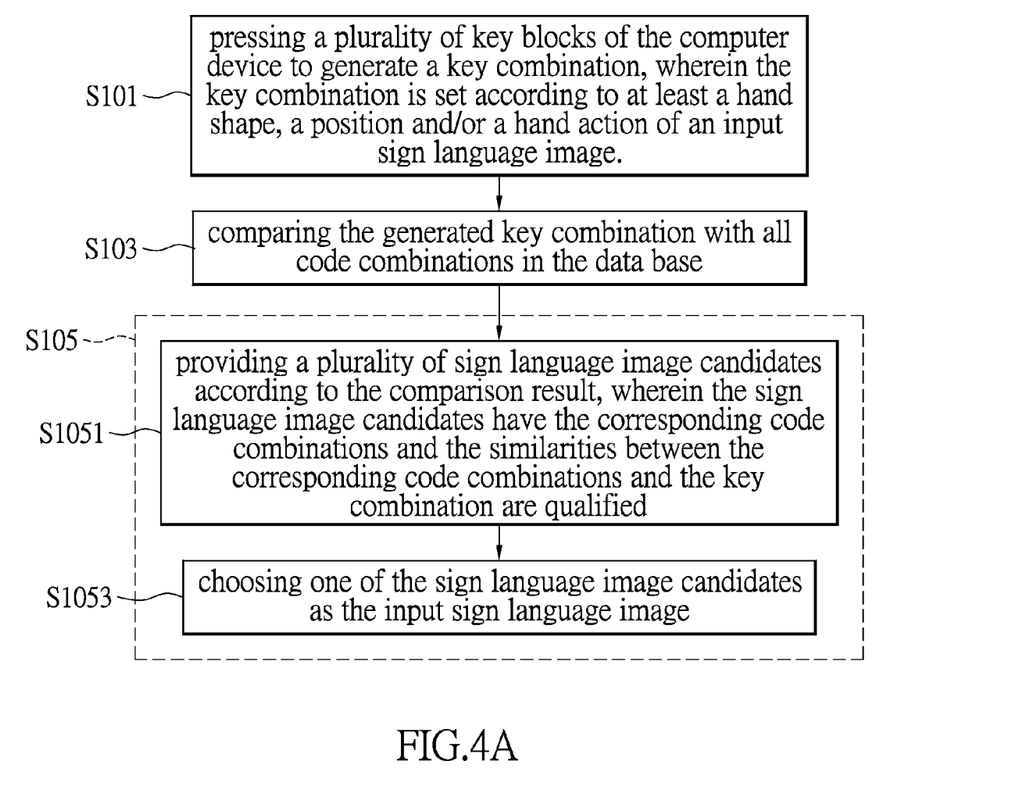
FIG. 4A shows another flow chart of a sign language image input method of one embodiment of the instant disclosure.

Moreover, in the sign language image input method provided by the instant disclosure can also provide the comparison results for the user to choose in a smart way, but it is not limited herein. For example, the comparison results would be provided in an order based on the utilization frequency. Thus, please refer to FIG. 4A, FIG. 4A shows another flow chart of a sign language image input method of one embodiment of the instant disclosure. In the following embodiment, only parts that are different from parts of the embodiment in the FIG. 1 described, and the identical parts are omitted. In addition, for an easy instruction, similar referred numbers or symbols indicates elements alike.

In FIG. 4A, the step S105 further comprises the following steps. In the step S1051, the computer device provides a plurality of sign language image candidates according to the comparison result, wherein the sign language image candidates have the corresponding code combinations and the similarities between the corresponding code combinations and the key combination are qualified. In the step S1053, the computer device chooses one of the sign language image candidates as the input sign language image.

More precisely, the step S1051 and the step S1053 in the sign language image input method in this embodiment is to implement the "smart key-in". In conjunction with FIG. 2 and FIG. 4A, in the step S101, as the key combination generated by pressing the key blocks is "1 chest", in the step S103, the computer device compares the key combination "1 chest" with all code combinations 203_0~203_k in the database. In the step S1051, the computer device finds the code combinations 203_0 and 203_1 according to the comparison result, wherein the similarity between the code combination 203_0 and the key combination "1 chest", and the similarity between the code combination 203_1 and the key combination "1 chest" are qualified (because there is "1 chest" in both the code combinations 203_0 and 203_1). After that, the sign language images 201_0 and 201_1 corresponding to the found code combinations 203_0 and 203_1 are provided as the sign language image candidates.

Figure 4B:
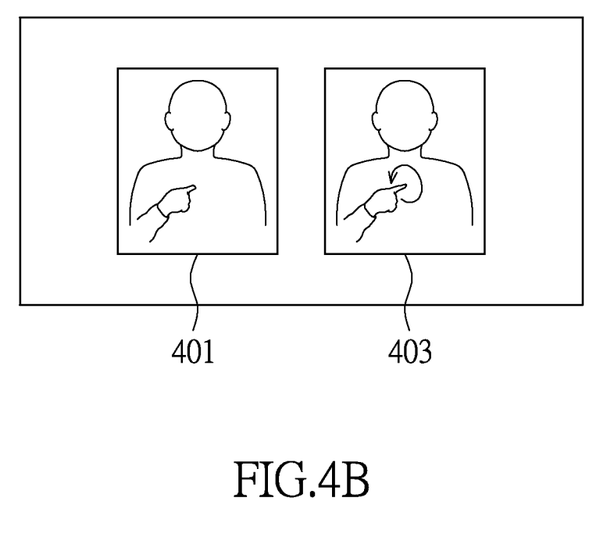
FIG. 4B shows a sign language image candidate provided by one embodiment of the instant disclosure.

Please refer to FIG. 4B, FIG. 4B shows a sign language image candidate provided by one embodiment of the instant disclosure. In practice, The order of the sign language image candidates 401, 403 provided by the computer device is mainly based on the comparison results of the key combination "1 chest" and the code combinations 203_0, 203_1 corresponding to the sign language image candidates 401, 403. In other words, according to the comparison results of the key combination "1 chest" and the code combinations 203_0, 203_1, the order of the sign language image having smaller similarity is behind the order of the sign language image having larger similarity. Accordingly, the order of the sign language image candidates 401, 403 is shown as FIG. 4B. It is worth noticing that, the skilled in the art can set the way to compare the similarities of the key combination and the code combinations in the database based on needs, it is not limited herein. In addition, the above mentioned sign language image candidates 401, 403 can be arranged in an order based on the similarity or in an order based on the utilization frequency, and it is either not limited herein.

Finally, in the step S1053, among the sign language image candidates 401, 403 provided by the computer device, the user chooses one of the sign language image candidates 401, 403 as the input sign language image. For example, if the user tends to input a sign language image representing for "me", the user can choose the sign language image candidate 401 or the sign language image candidate 403 as the input sign language image).

Figure 5:
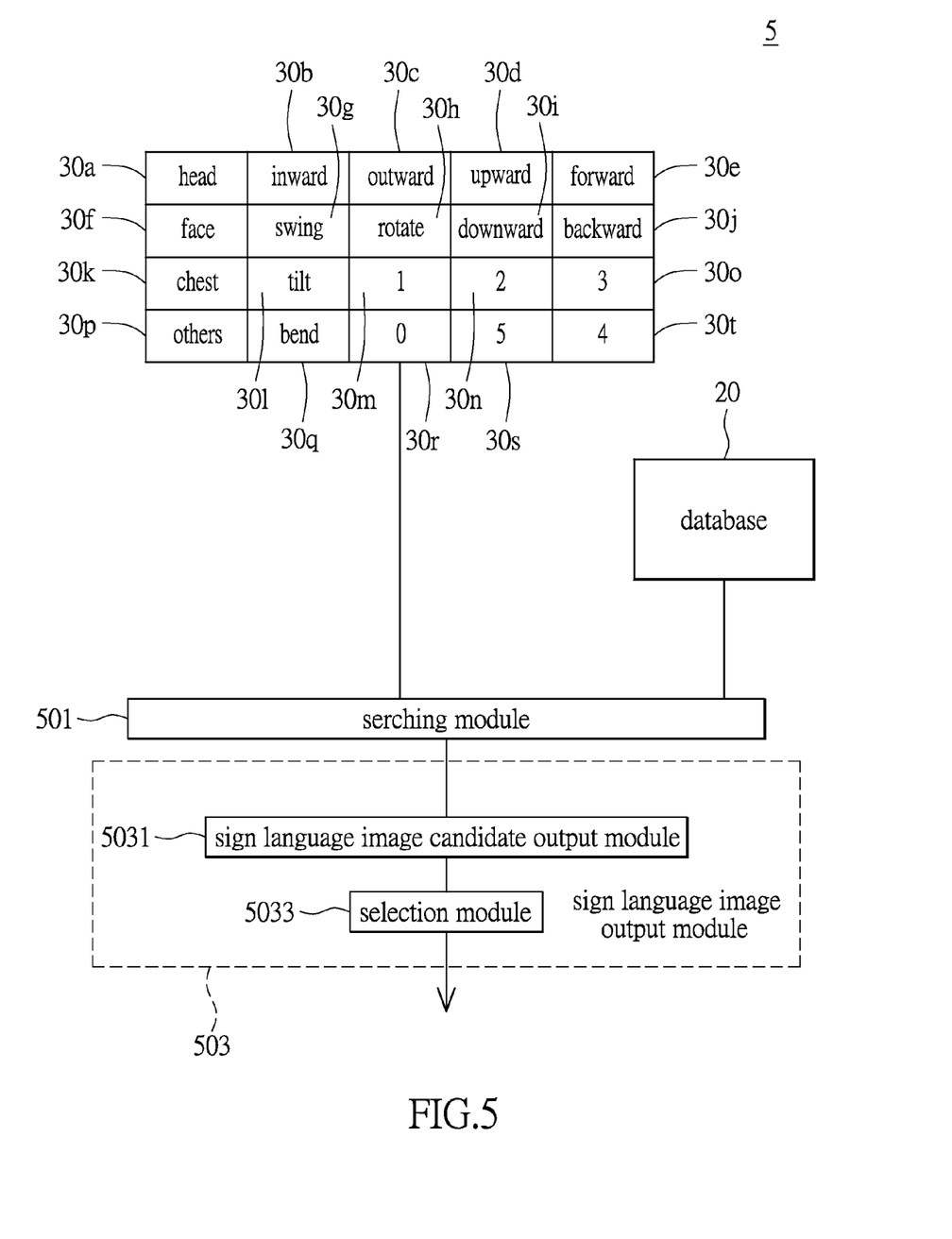
FIG. 5 shows a block diagram of a sign language image input device of one embodiment of the instant disclosure.

As mentioned above, the sign language image input method can be applied in any kind of computer device. In order to further illustrate the operation of sign language image input method, another embodiment is provided as below. Please refer to FIG. 5, FIG. 5 shows a block diagram of a sign language image input device of one embodiment of the instant disclosure. Even though every country in the world respectively develop different sign languages based on its native language, the sign language image input method provided by the embodiment of the instant disclosure can suitably applied in any sign language of any country. In addition, the sign language image input device 5 in the following description is for implementing one embodiment of the above mentioned sign language image input methods, but not for restricting the instant disclosure.

The sign language image input device 5 may be a desk top or a lap top, but it is not limited herein. The sign language image input device 5 may comprise one or a plurality of circuits, configured to the database 20, a plurality of key blocks 30a~30t, the searching module 501 and the sign language image output module 503. In the embodiment shown in FIG. 5, there are parts the same as the embodiments in FIG. 2 and FIG. 3 described, and the omitted parts are indicated to be identical to the embodiments in FIG. 2 and FIG. 3. In addition, for an easy instruction, similar reference numbers or symbols refer to elements alike. In addition, the above mentioned elements can be implemented via the hardware circuits or the combination of the hardware circuits and the firm wares or the soft wares; however, the implementation of the sign language image input device 5 is not limited herein.

Please again refer to FIG. 5, there are a plurality of sign language images stored in the database 20, and each sign language image has a corresponding code combination. At least one key combination generated by the user's pressing the key combinations 30a~30t, wherein the key combinations are set based on at least one hand shape, one position and on hand action. The searching module 501 receives the pressed key combination, and compares the pressed key combination with all code combinations in the database 20. The sign language image output module 503 outputs an input sign language image according to the comparison result.

Moreover, the sign language image input device 5 can also provide the comparison results for the user to choose in a smart way, but it is not limited herein. For example, the comparison results would be provided in an order based on the utilization frequency. Thus, the sign language image output module 503 further comprises the sign language image candidate output module 5031 and the selection module 5033. First, according to the comparison result, the sign language image candidate output module 5031 provides a plurality of sign language image candidates, wherein the sign language image candidate is the sign language image corresponding to the code combination, and the similarity of this code combination and the pressed key combination is qualified. In addition, the selection module 5033 chooses one of the sign language image candidates as an input sign language image according to a selection order. It is worth noticing that, the skilled in the art can set the selection order based on needs, and also the detailed implementation of the selection order is not limited herein. For example, the selection order can be input by the user or be automatically generated according to the input sign language image.

To sum up, the sign language image and the device using the same provided by the embodiments of the instant disclosure can generate the corresponding sign language images via a simplified key-in process, which makes people easily record or send the sign language images via the modern communication technology and thus improves the convenience for the communication among the deaf.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A sign language image input method for a sign language image input device, wherein the sign language image input device comprises a processor, a database and a keyboard having a plurality of key blocks, a plurality of sign language images are stored in the database and each of the sign language images corresponds to a code combination, the sign language image input method comprising:

generating at least a key combination via pressing the key blocks of the keyboard, wherein the key blocks comprises a plurality of number keys, position keys and hand action keys, the key combination be set according to at least one number key, position key and/or hand action key of the key blocks, wherein the number key is defined as a number of fingers in an input sign language image, the position key is defined as a position of a human organ that is pointed at by the fingers in the input sign language image, and the hand action key is defined as a movement of the fingers or hands in the input sign language image;

comparing, by a searching module of the processor, the key combination with the code combinations in the database; and outputting, by a sign language image output module of the processor, the input sign language image according to a comparison result of the key combination and the code combinations.

2. The sign language image input method according to claim 1, wherein the step "outputting the input sign language image according to a comparison result of the key combination and the code combinations" further comprises:

providing a plurality of sign language image candidates according to the comparison result, wherein the sign language image candidates are the sign language images corresponding to the code combination and the similarity between the code combination and the key combination is qualified; and selecting one of the sign language image candidates as the input sign language image.

3. The sign language image input method according to claim 1, wherein the sign language image input device is one of a mobile communication device, a desktop computer and a laptop.

4. The sign language image input method according to claim 2, wherein the sign language image candidates are orderly arranged according to the comparison result of the key combination and the code combinations.

5. The sign language image input method according to claim 1, wherein each of the sign language images in the database corresponds to a representative term.

6. A sign language image input device, comprising:
a processor;
a database, a plurality of sign language images stored in the database, each of the sign language images corresponding to a code combination; and
a keyboard having a plurality of key blocks, generating at least a key combination via pressing the key blocks of the keyboard, wherein the key blocks comprises a plurality of number keys, position keys and hand action keys, the key combination be set according to at least one number key, position key and/or hand action key of the key blocks, wherein the number key is defined as a number of fingers in an input sign language image, the position key is defined as a position of a human organ that is pointed at by the fingers in the input sign language image, and the hand action key is defined as a movement of the fingers or hands in the input sign language image;

wherein the processor further comprises:
a searching module, configured to receive the key combination and compare the key combination with the code combinations in the database; and
a sign language image output module, configured to output the input sign language image according to a comparison result of the key combination and the code combinations.

7. The sign language image input device according to claim 6, wherein the sign language image output module further comprises:

a sign language image candidate output module, providing a plurality of sign language image candidates according to the comparison result of the key combination and the code combinations, wherein the sign language image candidates are the sign language images corresponding to the code combination and the similarity between the code combination and the key combination are qualified; and a selection module, selecting one of the sign language image candidates according to a selection order as the input sign language image.

8. The sign language image input device according to claim 6, wherein the sign language image input device is one of a mobile communication device, a desktop computer and a laptop.

9. The sign language image input device according to claim 7, wherein the sign language image candidates are orderly arranged according to the comparison result of the key combination and the code combinations.

10. The sign language image input device according to claim 6, wherein each of the sign language images in the database corresponds to a representative term.

* * * * *